INVENTOR
CARL J. KUGLER
BY
ATTORNEYS

United States Patent Office 3,538,766
Patented Nov. 10, 1970

3,538,766
FLOW METERING APPARATUS WITH COMPENSATOR
Carl J. Kugler, Philadelphia, Pa., assignor to American Meter Company, Philadelphia, Pa., a corporation of Delaware
Filed Aug. 25, 1967, Ser. No. 663,351
Int. Cl. G01f *1/02*
U.S. Cl. 73—194      2 Claims

ABSTRACT OF THE DISCLOSURE

The output shaft of a volumetric meter for elastic fluid drives a first drum, which, in turn, drives a rotable disc through a floating ring controlled in response to fluid temperature. An output drum is driven by the disc through a second floating ring adjusted in response to fluid pressure.

BACKGROUND OF THE INVENTION

Heretofore, in metering devices used for measuring the volume of gas flowing through a passage, corrections for variations in temperature and pressure of the gas have been made by providing correcting devices of the integrating type in series. For example, the temperature correcting device would have an input shaft driven from a metering apparatus, and an output shaft, and a similar pressure correcting device would have an input shaft driven by the output shaft of the temperature correcting device. While such arrangements are satisfactory from the standpoint of operation, they necessarily involve structural complexities.

SUMMARY OF THE INVENTION

In accordance with the invention, pressure and temperature correcting devices are incorporated into a single compact unit having a single input shaft and a single output shaft, which may be arranged, if desired, along a common axis. The input shaft drives a disc through a floating ring, which is adjusted through a first floating lever to vary the drive ratio between the drum and the disc. The disc drives the output shaft through a second floating ring, and a second drum. The second floating ring is adjusted independently to vary the drive ratio between the disc and the output shaft. It will be apparent that a compact arrangement results since only one disc is required. By using floating rings in the compensating mechanism, a high degree of sensitivity is achieved since a floating ring may be very easily turned by turning of its associated lever and assumes a lateral position, in turn moving its lever, as a result of the force imparted to it by its associated driving element, very little friction being involved in such operations so that only very little force is required to make one adjustment.

In a volumetric metering device in which temperature and pressure corrections are to be made, it will be apparent that various difficulties will arise as consequences of the differences in the relationships between corrected volume and pressure and between corrected volume and temperature, the former being linear, and the latter being non-linear (hyperbolic). The pressure and temperature responses of the compensating apparatus must conform to the variations in the pressure and temperature inputs, which are normally linear or at least approximately so. Where separate compensating devices for pressure and temperature are provided in series, each must therefore respond differently. This requirement gives rise to complications in the mechanical structure. The principal object of the invention, therefore, is to provide a compensating mechanism responsive to two variables which is simple in construction, and in which a high degree of sensitivity is achieved.

Other objects will be apparent from the following description read in conjunction with the accompanying drawings.

DESCRIPTION OF THE PREFERRED EMBODIMENT

Figure 1:
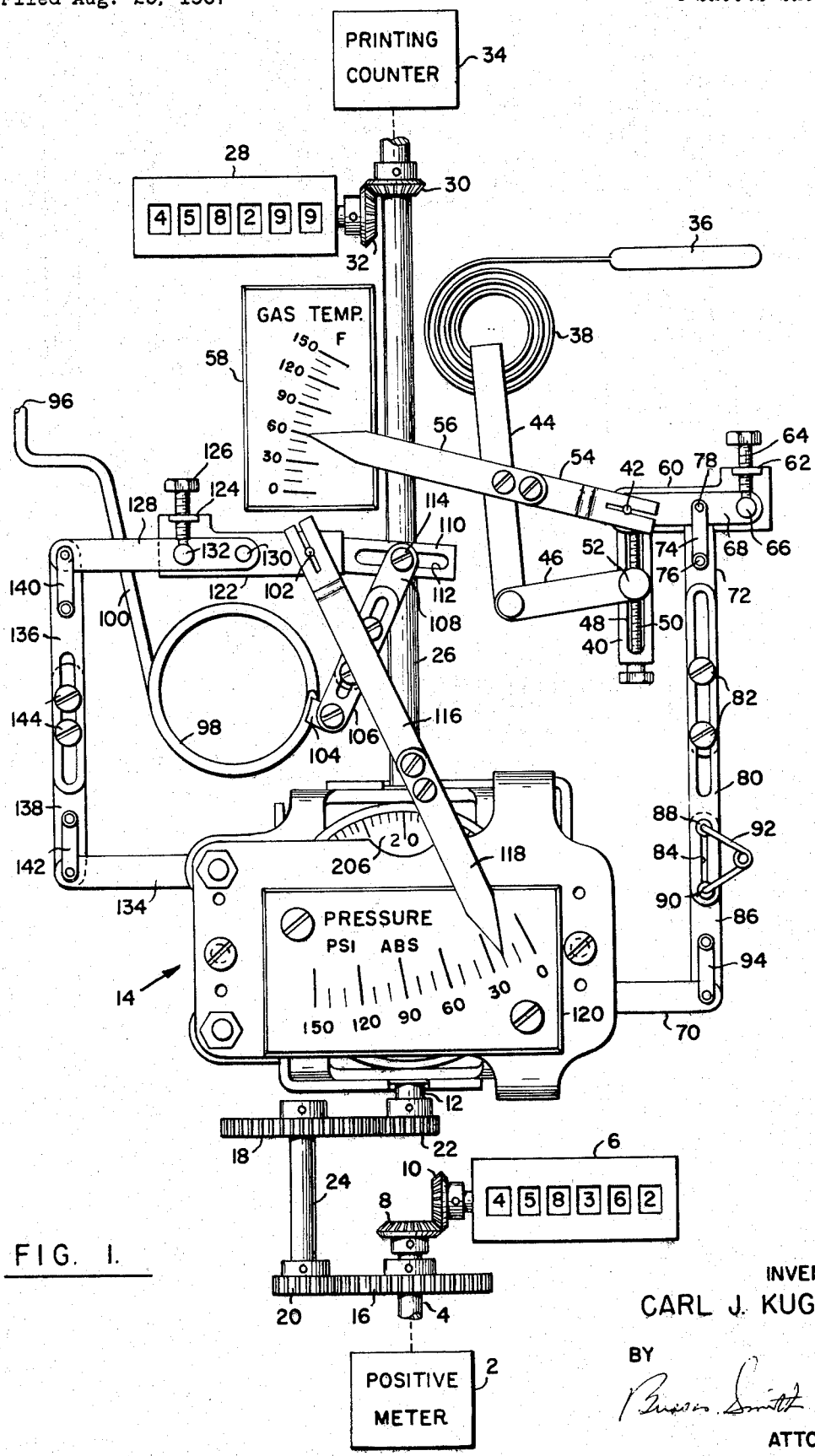
FIG. 1 is a partially diagrammatic elevation of a metering apparatus provided with a compensating mechanism in accordance with the invention.
Figure 2:
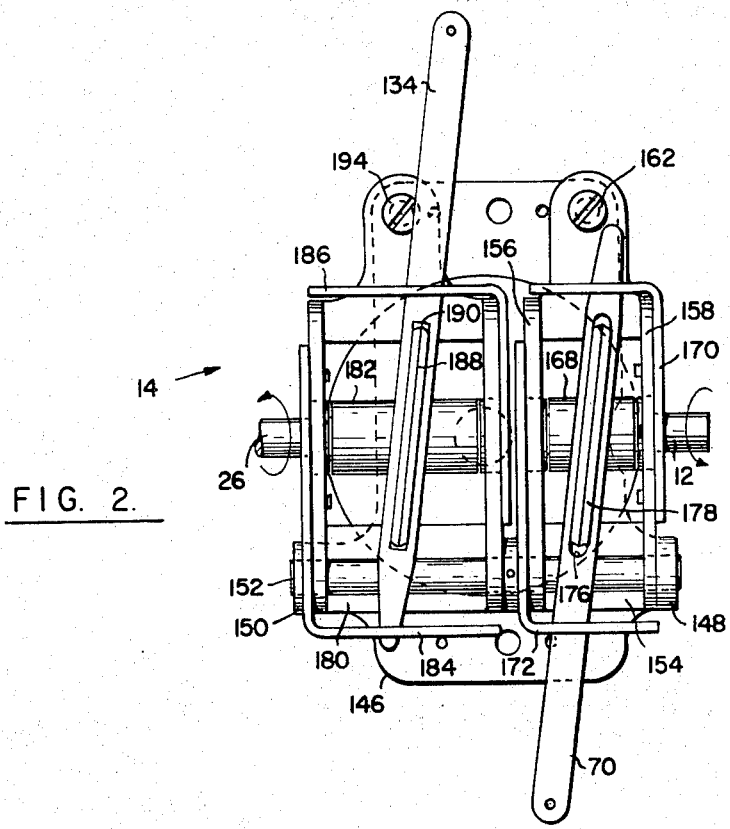
FIG. 2 is a rear elevation of the compensating mechanism.
Figure 3:
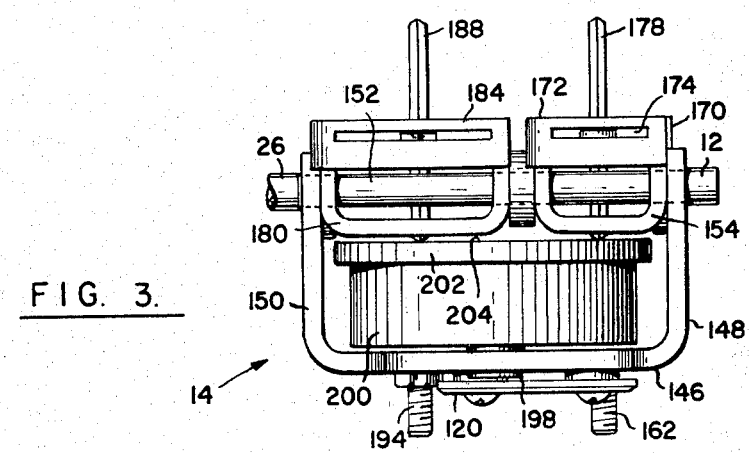
FIG. 3 is a side elevation of the compensating mechanism as viewed from the right-hand side of FIG. 1.

Referring to FIG. 1, a volumetric meter for a gas or other elastic fluid (a vapor) of any well-known type providing an output to a rotating shaft is indicated at 2. Such meters, when used for measuring quantities of gas, are commonly of the bellows type, and, for simplicity this type will be assumed, although it will be apparent that other types of meters including dynamic (non-positive or turbine) meters may be used. Meter 2 delivers its output to shaft 4, and operates counter 7 through bevel gears 8 and 10, the counter being provided for a visual check of the operation of the meter.

The input shaft 12 of the compensating mechanism, indicated generally at 14, is driven through a speed-increasing train including gears 16 and 18, pinions 20 and 22 and shaft 24.

Output shaft 26 of the compensating mechanism drives counter 28 through a pair of bevel gears 30 and 32, and may be arranged to operate a printing counter indicated diagrammatically at 34. Such printing counters are well-known, and periodically print a counter indication on a moving chart to produce a record from which times and corresponding counter indications can be determined. Counters 28 and 34 indicate volume reduced to standard conditions. A temperature sensing element 36 is arranged to sense the temperature of the gas at the meter location and to operate Bourdon tube 38. Bourdon tube 38 rotates arm 40 about the axis of shaft 42 through a linkage comprising arm 44 and link 46. Arm 40 is provided with a slot 48, in which is located an adjusting screw 50, which passes through a threaded hole in element 52 pivoted on the end of arm 46 to determine the effective lever arm and therefore the extent of movement of arm 40 in response to temperature variations determining the position of the end of the Bourdon tube.

Shaft 42 is rotatable, and rides in fixed bearings (not shown). Movement of arm 40 causes rotation of shaft 42, and arm 54, the end of which is clamped to the shaft, rotates with variations of temperature. Pointer 56 is fixed to arm 54, and provides a direct indication of temperature by pointing to markings on plate 58. Arm 60 is also fixed to shaft 42, and is provided with a threaded flange 62, through which passes an adjusting screw 64. The lower end of adjusting screw 64 is mounted in element 66 on the end of arm 68 so that the position of arm 68 with respect to arm 60 can be adjusted. Arm 68 is mounted loosely on shaft 42 so that its position is not directly affected by the position of pivot 42, but is affected through arm 60.

A link is provided between arm 68 and a floating lever 70. This link includes element 72, which is attached to arm 68 by a spring clip 74 riveted at 76 to element 72 and provided with a pin 78, which engages a small hole in arm 68. Arm 72 is fastened to arm 80 by screws 82, which pass through an aligned slot in arm 80 and which are threaded into holes in arm 72. Screws 82 provide a linearity adjustment, and screw 64 provides a zeroing adjustment.

An additional slot 84 is provided in element 80, and a corresponding slot is provided in element 86, this corresponding slot being aligned with slot 84. A pair of spool-like elements 88 and 90 are arranged in slot 84 and the corresponding slot in element 86, and rims on these spool-like elements prevent elements 80 and 86 from separating. The ends of a spring 92 pass through holes provided in elements 88 and 90, and spring 92 tends to hold elements 88 and 90 apart from each other and against the end of the slots. This arrangement provides a lost-motion connection between elements 80 and 86, and permits a degree of over-travel of element 80 in either direction beyond the limits of movement of lever 70. Element 86 is attached to element 70 by spring clip 94, which is similar to clip 74.

Opening 96, which communicates with the gas entering meter 2, is connected to Bourdon tube 98 through tube 100. Rotatable shaft 102 is operated through a linkage including element 104, which is attached to the Bourdon tube, elements 106 and 108, which are held together by screws for relative adjustment, and arm 110, which is fixed to rotatable shaft 102. Arm 110 is provided with a slot 112, and element 108 is attached at any desired position along arm 110 by screw 114.

Arm 116 is frictionally attached to pivot 102, and is provided with a pointer 118, from which may be read pressure indications on plate 120 mounted on the frame of the compensating mechanism.

Arm 122 is rotated through rotation of shaft 102, and is provided with a flange 124 and an adjusting screw 126 similar to those provided on arm 60. Arm 128 is pivoted on arm 122 by pin 130, and its angular position with respect to arm 122 is adjusted by zero adjusting screw 126, the end of which is mounted in element 132. Lever arm 134 is connected to arm 128 through a linkage including slotted element 136 and element 138, which are attached to the respective arms 128 and 134 by spring clips 140 and 142. A pair of adjusting screws 144 pass through the slot in element 136 and through threaded holes in element 138 and are provided to permit an adjustment for linearity.

Referring to FIGS. 2 through 6 inclusive, the compensating mechanism 14 is shown having a frame 146. Frame 146 is provided with a pair of members 148 and 150 through which extends pin 152. A first movable frame 154 includes arms 156 and 158, both of which are provided with holes through which pin 152 passes. Frame 154 is thus adapted to rotate about pin 152, but is constrained by spring 160, which surrounds screw 162, and which is held in compression between the head of screw 162 and flange 164 of frame 154. Screw 162 is threaded into frame 146 and is held by nut 166.

Shaft 12 passes through a bearing in arm 158, and drives drum 168, the opposite end of which is borne in arm 156. Additional frame members 170 and 172 are fastened to arms 158 and 156 respectively, and are provided with slots through which floating lever 70 passes. Member 172 is provided with slot 174, and a similar slot (not shown) is provided in member 170. Floating lever 70 is provided with an elongated slot 176, approximately coextensive with the diameter of ring 178, which fits over the ring with just sufficient running clearance to permit rotation of ring 178, but tightly enough to provide positive control of the angular position of the ring and lateral positioning of the lever by the ring.

Frame 180 is mounted for rotation about pin 152 independently of the position of frame 154, and is similarly provided with bearings for drum 182 which drives output shaft 26. Members 184 and 186 are slotted to hold control lever 134, and ring 188 is held in slot 190 and positioned by lever 134. Frame 180 is constrained by spring 192, which is held in compression between the head of screw 194 and flange 196 on frame 180. Levers 70 and 134 extend approximately diametrically across their respective rings 178 and 188.

A shaft 198 is fixed to frame 146, and extends into the interior of hollow cylindrical member 200, in which a bearing is provided permitting rotation of member 200 about shaft 198.

A disc 202 is mounted on member 200, and the disc is provided with a smooth face 204. It should be noted at this point that drums 168 and 182 are arranged so that their axes are parallel to radii of surface 204.

Figure 7:
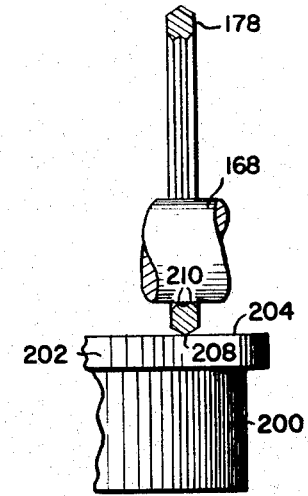
FIG. 7 is a fragmentary view showing a floating ring in its relationship with a drum and a disc.
Figure 4:
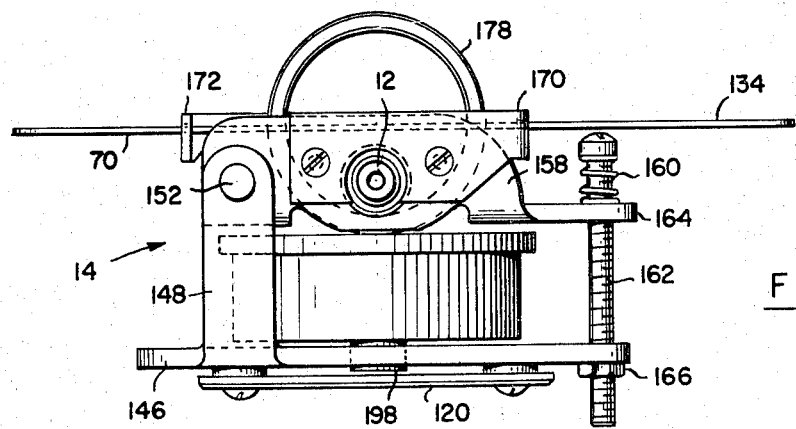
FIG. 4 is a bottom view of the compensating mechanism.
Figure 5:
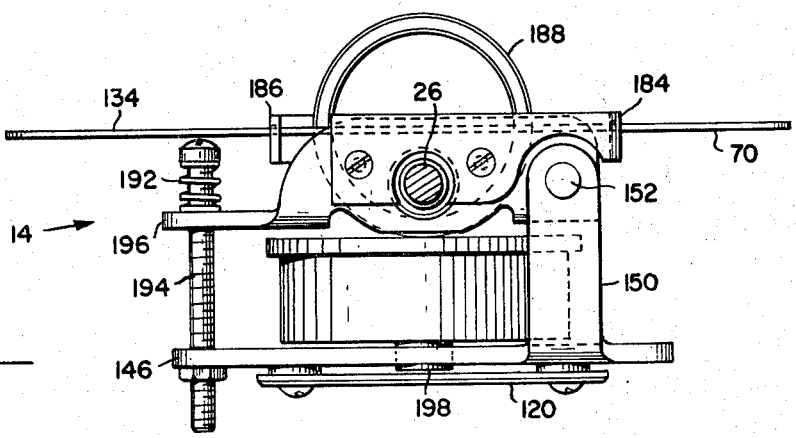
FIG. 5 is a plan view of the compensating mechanism.

Rings 178 and 188 are held against face 204 of disc 202 by drums 168 and 182, respectively. The cross-section of each ring, as shown in FIG. 7, is desirably such that a single point of contact exists between the outer edge of each ring and the face of disc 202, while a pair of contact points exist between each drum and the inner surface of the corresponding ring. The outer surface of the ring is beveled to provide a circular edge 208, while the inner surface is provided with a pair of circular edges 210. It is desirable that the pair of edges 210 be close together. As an alternative, the inner surface of the ring may be in the form of a cylinder so that when the axes of the ring and the corresponding drum are aligned, a line of contact exists between the drum and the cylindrical surface of the ring. If the axes are not parallel, of course, only a pair of points of contact will exist between the ring and the surface of the drum. The rings are held tightly against the face of disc 202 by the action of springs 160 and 192 acting on the respective frames in which the drums are mounted. Because three points of contact are made between each ring, the disc and the corresponding drum, the rings are not liable to tilt, and will be maintained in stable positions normal to the disc surface.

Figure 6:
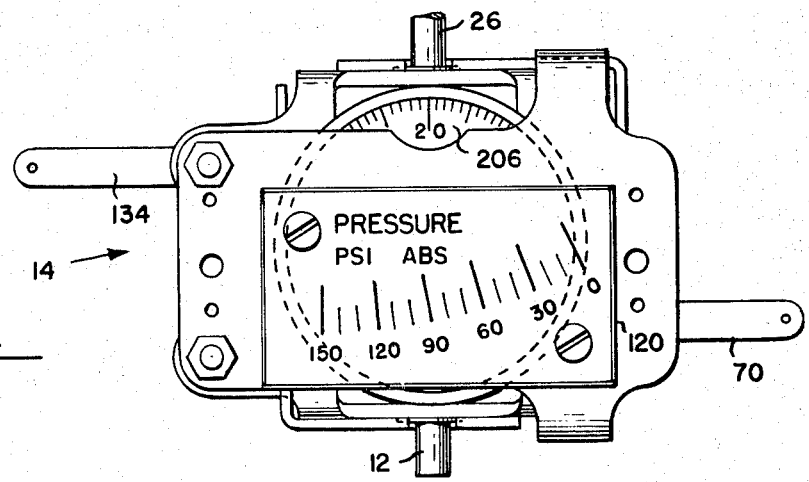
FIG. 6 is a front elevation of the compensating mechanism.

Referring to FIG. 6, the face 206 of member 200 is provided with markings, which, as will be discussed subsequently, may be used for calibration of the instrument.

The operation of each compensating mechanism takes advantage of the characteristics of the floating ring in order to accomplish sensitive adjustment of the drive ratio between shafts 12 and 26. In operation, referring specifically to FIG. 2, shaft 12 will rotate in a counterclockwise direction (facing its end), and still impart a counterclockwise rotation to disc 202 through ring 178. If the point of contact between ring 178 and the disc is nearer the outer edge of the disc, the disc will be driven relatively slowly, while if the point of contact is nearer the center of the disc, the rate of rotation of the disc with respect to the rate of rotation of shaft 12 will increase. Initially, floating lever 70 will be in a position such that the axes of drum 168 and ring 178 are parallel so that the plane of the ring edge is normal to the radius of the disc which extends through the point of contact of the ring edge with the disc. This is a stable position, and the ring will tend to remain in the same position so long as the floating lever is not moved. Movement of the end of floating lever 70 toward the left in response to a temperature decrease, will cause the axis of ring 178 to be moved out of parallelism with the axis of drum 168. The ring will be, in effect, "steered" by lever arm 70, and will be driven in a direction such that the axis of the ring again becomes parallel of the axis of drum 168, but the point of contact between the ring and the face of the disc will be nearer the center of the disc and aligned with the pivot on the end of lever arm 70. Thus, ring 178, returns to an orientation in which its axis is parallel to the axis of drum 168 and in which the plane of its edge is normal to the radius of the disc extending through the point of contact between the disc and the ring. The point of contact, however, is now closer to the center of the disc so that the disc is driven at a greater speed. It will be noted that very little effort is required to move lever arm 70, the majority of the force being used in imparting a very slight lift to drum 168 away from the face of the disc and in compression of spring 160. The force moving ring 176 to its final position is provided by the meter through shaft 12 and through drum 168.

An increase in temperature will likewise cause ring 178 to move toward the outer edge of the disc.

A decrease in pressure results in the movement of the pivot of arm 134 toward the right (FIG. 2), and the consequent "steering" of ring 188 will cause its point of contact with face 204 of the disc to move toward the center of the disc to decrease the rate or rotation of drum 182. Shaft 26 rotates in a counterclockwise direction (facing its end). The force providing the follow-up action of ring 188 is provided through the disc rather than through the drum.

The apparatus, in the operation discussed above, operates to account for the fact that lower temperature and higher pressures both increase the density of a gas so that a given volumetric flow to which the meter responds represents an increased mass flow, or, equivalently, an increased standard volume of flow.

Since the volume of a given quantity of gas is a function of its temperature and pressure according to the relationship:

(1) $$V = mR\frac{T}{P}$$

where:
T is the absolute temperature,
P is the absolute pressure,
m is the mass, and
R is the gas constant, a standard volume $V_0$, or the volume of the gas at an arbitrarily chosen standard temperature $T_0$ and pressure $P_0$ is related to the actual volume V by:

(2) $$V_0 = \frac{T_0}{T} \cdot \frac{P}{P_0} V$$

Figure 8:
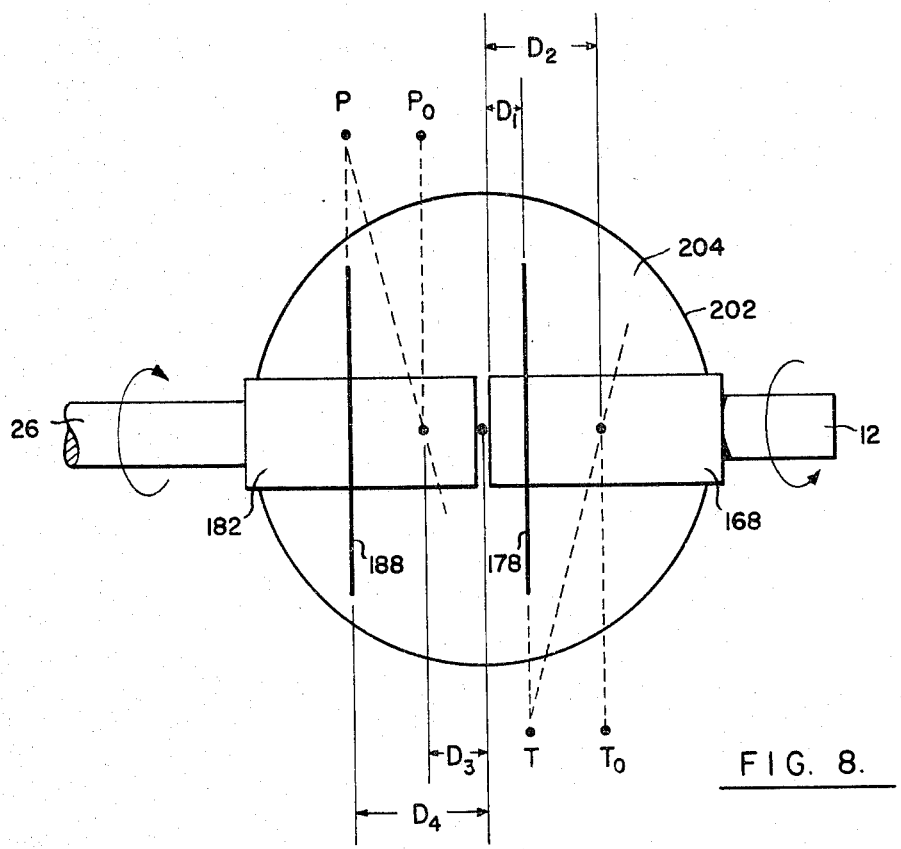
FIG. 8 is a diagrammatic view of the compensating mechanism illustrating the manner of its operation.

Referring now to FIG. 8, ring 178 is shown diagrammatically in its final relationship with disc surface 204 and drum 168, the point of contact being originally at a distance $D_2$ from the center of the disc and finally at a distance $D_1$ from the center of the disc. Assume that $D_2$ represents the position of the point of contact at the arbitrarily chosen standard temperature $T_0$, and $D_1$ represents the position of the point of contact at temperature T. The new drive ratio between drum 168 and disc 202 at T is related to the drive ratio at $T_0$ by $D_2/D_1$.

If the pressure is initially at the arbitrarily chosen standard pressure $P_0$, the point of contact between ring 188 and surface 202 is at a distance $D_3$ from the center of the disc. If the pressure increases to P, the point of contact moves to a distance $D_4$ from the center of the disc, and the new drive ratio between the disc and drum 188 is related to the drive ratio at standard pressure $P_0$ by $D_4/D_3$.

The drive ratio between shaft 12 and shaft 26 at temperature T and pressure P is related to the drive ratio at $T_0$ and $P_0$ by $$\frac{D_2}{D_1} \cdot \frac{D_4}{D_3}$$

Therefore, if $D_1$ varies linearly with absolute temperature T, and $D_4$ varies linearly with absolute pressure P, the output of the compensating mechanism at shaft 26 will be proportional to the standard volume flow in conformity with Equation (2).

The overall operation of the apparatus will now be discussed with reference to FIG. 1.

Assuming a constant flow through the positive meter 2 at a typical temperature and pressure such that counter 6 gives correct indications, e.g. 60° F. and 20 p.s.i., the points of contact between the rings and the disc will be in intermediate positions to set up a particular drive ratio between shafts 12 and 26 so that both counters 6 and 28 will give correct indications. If the temperature of the gas drops, counter 6 will give a false reading since a greater quantity of gas will be passed by meter 2 for a given amount of rotation of its output shaft 4. The operation of Bourdon tube 38, however, causes arm 70 to be moved upwardly, driving ring 178 toward the center of the disc. This increases the rate of rotation of the disc, and consequently increases the rate of rotation of the shaft 26, and a correct indication will appear on counter 28. An increase in temperature will, conversely, decrease the rate of rotation of shaft 26 to the correct rate.

If the pressure of the gas entering the meter 2 increases, the quantity of gas passing through the meter will be greater than the amount indicated by counter 6. The action of Bourdon tube 98 with an increase of pressure causes arm 134 to move upwardly to move ring 188 toward the outer edge of the disc. This increases the rate of rotation of shaft 26, and a correct indication again appears on counter 28. Conversely, if the pressure decreases, the rate of rotation of shaft 26 correspondingly decreases.

It will be apparent that simultaneous variations in temperature and pressure will present no difficulty to the compensating apparatus, and that simultaneous variations of temperature and pressure over large ranges can be accommodated. During calibration, the various linkages must be adjusted so that the positions of the floating rings will correspond linearly to absolute temperature and absolute pressure over the operating range.

By driving the disc through a temperature-responsive floating ring from a drum driven by the metering device, the reciprocal relationship between standard volume $V_0$ and temperature T in Equation (2) is successfully accommodated in the invention, this particular arrangement permitting a high degree of accuracy of compensation over a wide range of temperatures.

In order to calibrate the apparatus, it is desirable to provide markings on gear 16 or on another element driven by the positive meter so that the rotation of the shaft of the positive meter can be determined to a high degree of accuracy. Desirably, a number of rotations of shaft 4 are counter at a given temperature, and the indications on face 206 of the member 200 are read, it being known that, at a particular temperature, for a given number of rotations of shaft 4, member 200 should rotate through a certain number of degrees. Adjustments can be made at different temperatures by screw 50, screw 64 and screw 82, and it will be apparent that these adjustments are completely independent of the gas pressure.

In order to calibrate the instrument for pressure variations, a particular pressure may be applied at opening 96, and shaft 4 is allowed to rotate until a given number of rotations of member 200 are counted, it being known that at a particular pressure, each rotation of member 200 will correspond to a particular increase in the indications on counter 28. Adjustments may be made by changing the relationship between linkage elements 106 and 108, and by adjusting screw 126 and by adjusting the relationship between linkage elements 136 and 138. These adjustments are effected at several different pressures so that the rate of rotation of shaft 26 with respect to the rotation of member 200 is accurate over the operating range of pressures. It will be seen that this step in calibration is independent of temperature.

When the apparatus is used to measure quantities of gas over extended periods of time, printing counter 34 may be used to print gas volume indications on a moving chart periodically. When the apparatus is used over extended periods of time, a high degree of accuracy may be achieved in spite of substantial pressure and temperature variations. The compensating mechanism responds very rapidly to temperature and pressure variations, and provides accurate indications over extended periods, the compensator arrangement being ideally suited to simultaneous compensation for temperature and pressure variations over a wide range because of its construction involving a pair of floating rings, one positioned linearly in response to absolute temperature, and the other being positioned linearly in response to absolute pressure.

If it is desired, disc 202 can be replaced by a cone. With such a modification, the drums must be arranged parallel to the conical surface, and the input and output shafts will no longer be parallel to each other. The modified apparatus will, nevertheless operate in substantially the same manner as the apparatus described herein. The common element against which the floating rings bear must be an element having a surface of revolution consisting of straight line elements passing through its axis of rotation.

It will be apparent that numerous other modifications may be made on the invention as described without departing from its scope as defined in the following claims.

What is claimed is:

1. In combination, fluid metering means providing a mechanical output, a first drum, means rotating said first drum in response to the output of said metering means, rotatable means having a surface in the form of a surface of revolution having straight line elements passing through its axis of rotation, a first ring disposed between said first drum and the surface of said rotatable means, said drum driving said rotatable means through said ring, temperature sensing means adapted to sense the temperature of a fluid at the location of said metering means, means responsive to said temperature sensing means for shifting the axis of said first ring out of parallelism with the axis of said first drum in a direction such that, with increasing temperature, the distance between the axis of the rotatable means and the point of contact of the first ring and the rotatable means will increase linearly, a second drum, an output shaft connected to and driven by said second drum, a second ring disposed between said second drum and the surface of said rotatable means, said rotatable means driving said second drum through said second ring, pressure sensing means adapted to sense the pressure of the fluid at the location of the metering means, means responsive to said pressure sensing means for shifting the axis of said second ring out of parallelism with the axis of said second drum in a direction such that, with increasing pressure, the distance between the axis of the rotatable means and the point of contact of the second ring and the rotatable means will increase linearly.

2. A compensated metering apparatus for measuring fluid flow comprising fluid metering means providing a mechanical output, first means rotatable about an axis and having a surface in the form of a surface of revolution which varies in distance from said axis, second rotatable means rollable on said first rotatable means, means maintaining said second rotatable means in contact with the surface of said first rotatable means, means rotating said second rotatable means in response to the mechanical output of said metering means, temperature sensing means adapted to sense the temperature of the fluid at the location of the metering means, means responsive to said temperature sensing means for increasing the distance between the point of contact of said first and second rotatable means and the axis of said first rotatable means as the temperature sensed by said temperature sensing means increases, third rotatable means rollable on said first rotatable means, means maintaining said third rotatable means in contact with the surface of said first rotatable means, indicating means connected to be operated by said third rotatable means, pressure sensing means adapted to sense the pressure of the fluid at the location of the metering means, means responsive to said pressure sensing means for increasing the distance between the point of contact of said first and third rotatable means and the axis of said first rotatable means as the pressure sensed by the pressure sensing means increases, and a plurality of markings on said first rotatable means, spaced from the axis of rotation of said first rotatable means and angularly spaced from one another in order to allow determination of the extent of angular rotation of said first rotatable means with respect to any fixed reference for a predetermined angular displacement of said second rotatable means.

References Cited

UNITED STATES PATENTS

| | | | |
|---|---|---|---|
| 2,222,551 | 11/1940 | Ziebolz et al. | 74—190.5 XR |
| 2,889,713 | 6/1959 | Parish et al. | 74—190 |
| 2,901,173 | 8/1959 | Clicques | 73—194 XR |
| 3,073,157 | 1/1963 | Gehre. | |

FOREIGN PATENTS

| | | |
|---|---|---|
| 248,297 | 11/1963 | Australia. |
| 1,023,039 | 12/1952 | France. |

JAMES J. GILL, Primary Examiner

U.S. Cl. X.R.

73—233; 74—190